United States Patent [19]

Ishikawa

[11] 4,165,611
[45] Aug. 28, 1979

[54] SECONDARY AIR FEEDING DEVICE FOR AN INTERNAL COMBUSTION ENGINE

[75] Inventor: Norikatsu Ishikawa, Mishima, Japan

[73] Assignee: Toyota Jidosha Kogyo Kabushiki Kaisha, Tokyo, Japan

[21] Appl. No.: 783,768

[22] Filed: Apr. 1, 1977

[30] Foreign Application Priority Data

Nov. 26, 1976 [JP] Japan ............................. 51-141097

[51] Int. Cl.² ............................................... F01N 3/15
[52] U.S. Cl. ........................................ 60/290; 60/292; 60/293
[58] Field of Search ................. 60/290, 289, 293, 292

[56] References Cited

U.S. PATENT DOCUMENTS

| | | | |
|---|---|---|---|
| 3,869,858 | 3/1975 | Goto | 60/290 |
| 3,906,722 | 9/1975 | Garcea | 60/289 |
| 3,906,723 | 9/1975 | Matumoto | 60/290 |
| 3,919,843 | 11/1975 | Arnaud | 60/289 |
| 3,974,651 | 8/1976 | Nakajima | 60/290 |
| 4,027,478 | 6/1977 | Masaki | 60/290 |

Primary Examiner—Douglas Hart
Attorney, Agent, or Firm—Stevens, Davis, Miller & Mosher

[57] ABSTRACT

Disclosed is a secondary air feeding device for feeding secondary air into the exhaust passage located upstream of the catalytic converter. A diaphragm type secondary air control valve is provided for usually controlling an amount of secondary air fed into the exhaust passage. Said secondary air control valve stops the feeding operation of secondary air at the time of idling.

4 Claims, 3 Drawing Figures

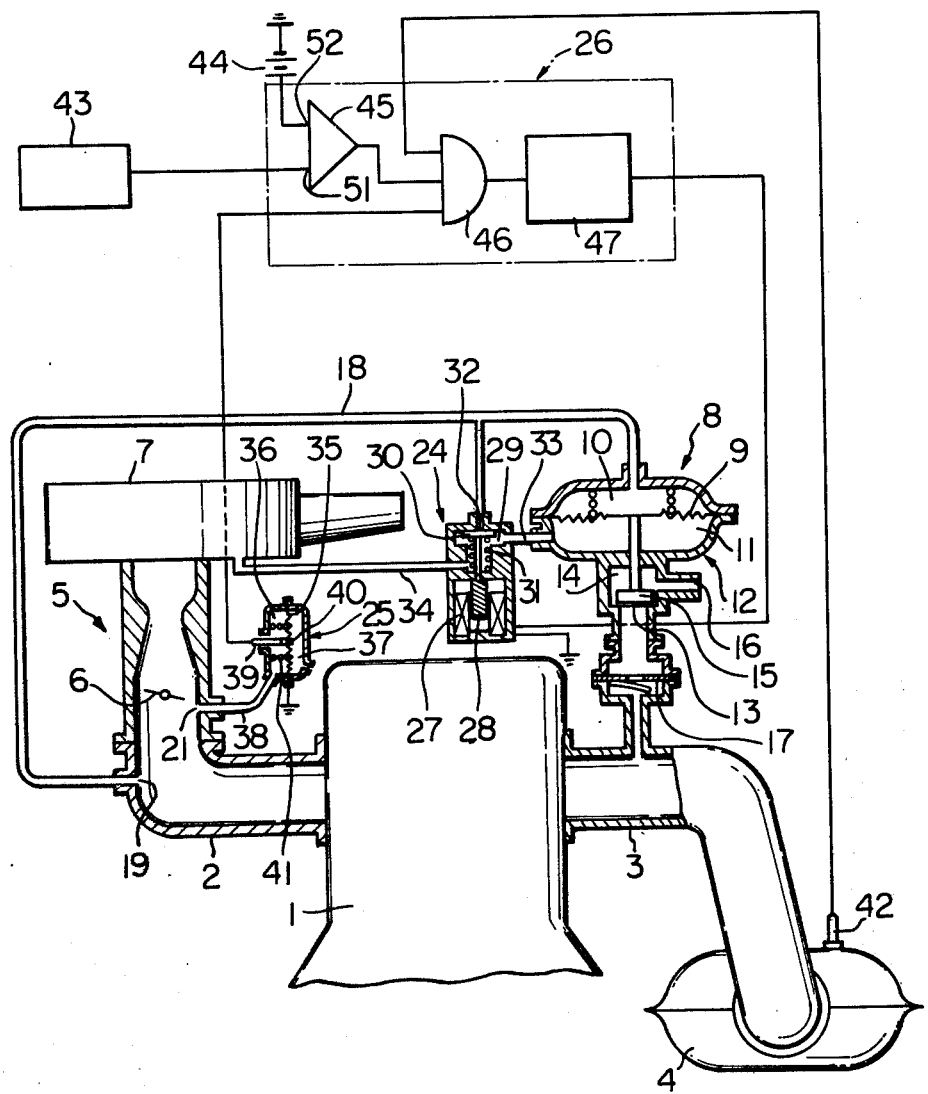

SECONDARY AIR FEEDING DEVICE FOR AN INTERNAL COMBUSTION ENGINE

DESCRIPTION OF THE INVENTION

The present invention relates to a secondary air feed control device in an internal combustion engine.

In order to reduce an amount of harmful HC and CO components in the exhaust gas, there has been known an exhaust gas purifying method in which a catalytic converter containing an oxidizing catalyzer therein is disposed in the exhaust system of the engine, and in which a secondary air is fed into the exhaust system located upstream of the catalytic converter for promoting oxidation of unburned components HC and CO in the exhaust gas, thereby reducing an amount of harmful HC and CO components. However, in general, since at the time of idling a relatively rich air-fuel mixture is fed into the cylinder of the engine, a large amount of harmful HC and CO components is produced. Consequently, if a large amount of secondary air is fed into the exhaust system of the engine at the time of idling, since oxidation of a large amount of unburned HC and CO components is caused, there occurs a problem in that the temperature of the catalyzer in the catalytic converter becomes extremely high.

An object of the present invention is to provide a secondary air feeding control device capable of preventing a deterioration of the catalyzer in such a manner that the feeding operation of secondary air is stopped or that the feeding amount of the secondary air is reduced at the time of idling.

According to the present invention, there is provided a secondary air feeding control device of an internal combustion engine which comprises an intake passage having a throttle valve therein and an exhaust passage having a catalytic converter therein, comprising a secondary air passage connecting the atmosphere to the exhaust passage located upstream of the catalytic converter, and a secondary air control means in said secondary air passage which is responsive to a change in the vacuum level in the intake passage for controlling the amount of secondary air fed into the exhaust passage and for reducing the amount of secondary air fed into the exhaust passage at the time of idling.

The present invention may be more fully understood from the following description of the preferred embodiments of the invention, together with the accompanying drawings.

BRIEF DESCRIPTION OF THE DRAWINGS

In the drawings:

FIG. 3 shows a further embodiment of a secondary air feeding control device.

DESCRIPTION OF THE PREFERRED EMBODIMENTS

Figure 1:
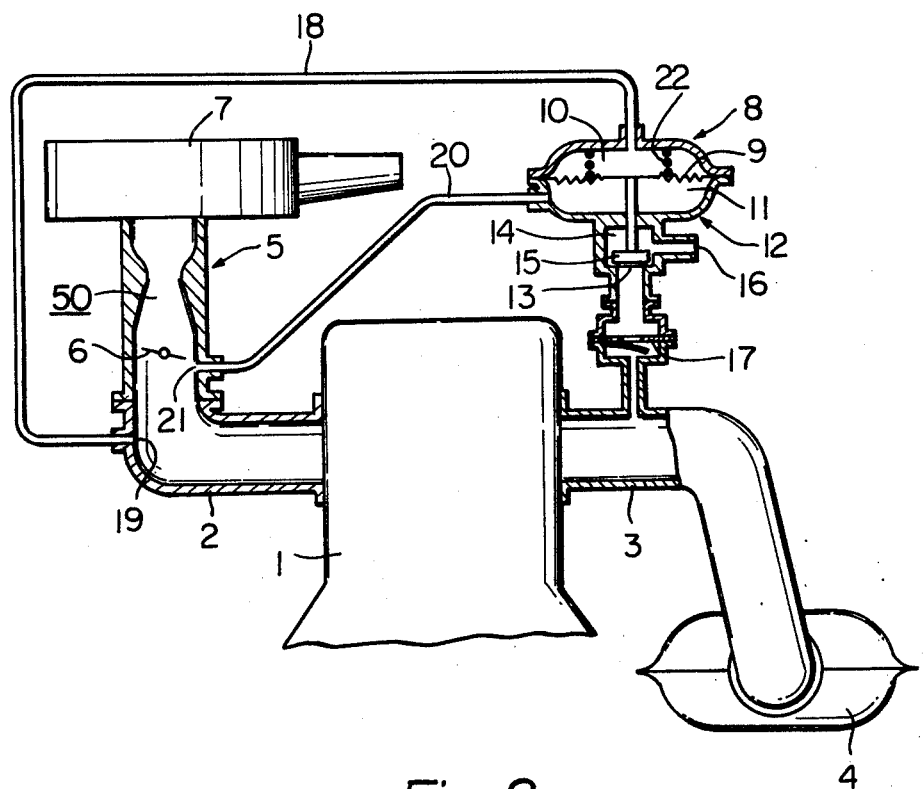
FIG. 1 shows a schematic view of an embodiment of a secondary air feeding control device according to the present invention.

Referring to FIG. 1, 1 designates an engine body, 2 an intake manifold, 3 an exhaust manifold, 4 a catalytic converter containing oxidizing catalyzer therein, 5 a carburetor, 6 a throttle valve of the careburetor 5, 7 an air cleaner and 8 a secondary air feed control valve device. This control valve device 8 comprises a diaphragm apparatus 12 having a vacuum chamber 10 and a pressure control chamber 11 separated by a diaphragm 9, and a valve chamber 14 having a valve port 13. An opening control valve 15 is disposed in the valve chamber 14 and is connected to the diaphragm 9 so as to control an opening area of the valve port 13 in accordance with the movement of the diaphragm 9. The valve chamber 14 is connected to atmosphere via an opening 16 on one hand, and to exhaust manifold 3 via a reed valve 17 which allows an outflow of secondary air from the valve chamber 14 to the exhaust manifold 3 on the other hand. The vacuum chamber 10 is connected via a vacuum conduit 18 to a vacuum port 19 which opens to the inside of the intake manifold 2 at a position located downstream of the throttle valve 6, while the pressure control chamber 11 is connected via a vacuum conduit 20 to a vacuum port 21 which opens to an intake passage 50 at a position located downstream of the throttle valve 6 when the throttle valve 6 is in the closed position and which opens to an intake passage 50 at a position located upstream of the throttle valve 6 when the throttle valve 6 is slightly opened.

Assuming that the engine is operating and the throttle valve 6 is open, a vacuum is produced in the vacuum chamber 10, while the pressure in the pressure control chamber 11 is maintained at an approximately atmospheric pressure since the pressure in the vacuum port 21 is at approximately atmospheric pressure. Consequently, the diaphragm 9 moves upwards against the spring force of a compression spring 22, whereby the opening control valve 15 opens the valve port 13. As a result of this, secondary air is fed into the exhaust manifold 3 via the opening 16, the valve chamber 14, the valve port 13 and the reed valve 17 due to the vacuum in the exhaust manifold 3 which was created by the pulsation caused by the exhaust gas pressure.

On the other hand, at the time of idling and deceleration, as shown in FIG. 1, a vacuum exists at the vacuum port 21 thus, the vacuum in the vacuum chamber 10 becomes the same vacuum as that in the pressure control chamber 11. At this time, the diaphragm 9 moves downwards due to the spring force of the compression spring 22. Consequently, the opening control valve 15 closes the valve port 13, whereby the feeding operation of the secondary air is stopped.

Figure 2:
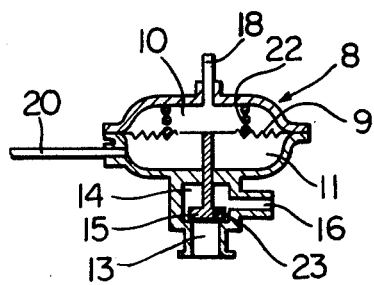
FIG. 2 shows another embodiment of a secondary air feeding control valve device.

Instead of using a secondary air feed control valve device 8 shown in FIG. 1, a secondary air feed control valve device shown in FIG. 2 may be used. In this embodiment, as shown in FIG. 2, the opening control valve 15 has a small hole 23 communicating the valve chamber 14 with the valve port 13. Consequently, in this embodiment, even if the opening control valve 15 completely closes the valve port 13, a small amount of secondary air is fed into the exhaust manifold 3 (FIG. 1) via the small hole 23.

In addition, in an embodiment shown in FIG. 1, secondary air is fed into the exhaust manifold 3 due to a vacuum existing in the exhaust manifold 3 created by pulsation which is caused by the exhaust gas pressure. However, the opening 16 may be connected to the delivery side of an air pump (not shown) driven by the engine so that secondary air is fed into the exhaust manifold 3 due to the delivery pressure of the air pump.

FIG. 3 shows the other embodiment according to the present invention. In FIG. 3, similar components are indicated with the same reference numerals in FIG. 1. In FIG. 3, 24 designates an electromagnetic switching valve, 25 a vacuum detecting switch and 26 an electromagnetic switching valve control circuit. The electromagnetic switching valve 24 comprises a solenoid 27, a plunger 28 movable in the solenoid 27, a valve chamber 29 and an opening valve 30 disposed in the valve chamber 29 and connected to the plunger 28. The opening valve 30 is biased upwards due to the spring force of a compression spring 31, and usually closes a valve port 32 connected to the vacuum conduit 18. The valve chamber 29 is connected to the pressure control chamber 11 via a conduit 33 on one hand, and to the air cleaner 7 via a conduit 34 on the other hand. Consequently, the pressure in the pressure control chamber 11 is usually maintained at atmospheric pressure.

The vacuum switch 25 has in its housing a vacuum chamber 36 and an atmospheric pressure chamber 37 separated by a diaphragm 35. This vacuum chamber 36 is connected to the vacuum port 21 via a vacuum conduit 38. Disposed in the vacuum chamber 36 are a stationary contact 39 and a movable contact 40 fixed onto the diaphragm 35 and arranged so as to face opposite the stationary contact 39. When the throttle valve 6, as shown in FIG. 1, is in the idling position and thereby creating a vacuum in the vacuum chamber 36, the diaphragm 35 moves to the left-hand side of FIG. 1 against the spring force of a compression spring 41, whereby the stationary contact 39 comes into contact with the movable contact 40.

A temperature detecting switch 42 is disposed in the catalytic converter 4 for detecting the temperature of the oxidizing catalyzer. This temperature detecting switch 42 is turned to the ON condition from the OFF condition when the temperature of the catalyzer increases beyond a predetermined value. Numeral 43 designates a tachometer driven by the engine. This tachometer generates an output voltage proportional to the number of revolutions of the engine.

The electromagnetic switching valve control circuit 26 comprises a comparator 45 having a first input 51 connected to the output side of the tachometer 43 and a second input 52 connected to a reference voltage source 44, an AND circuit 46 and an amplifier 47 connected to the output side of the AND circuit 46, said AND circuit 46 having three inputs connected to the output sides of the vacuum detecting switch 25, the comparator 45 and of the temperature detecting switch 42. The output side of the amplifier 47 is connected to the solenoid 27 of the electromagnetic switching valve 24. When the output voltage of the tachometer 43 is lower than the voltage of the reference voltage source 44, that is, the number of revolutions of the engine is lower than a predetermined value, the comparator 45 is turned to the ON condition.

Consequently, when the throttle valve 6 is in the idling position and the number of revolutions of the engine is lower than a predetermined level, and also when the temperature of the catalyzer is higher than a predetermined level, the AND circuit 46 is turned to the ON condition, whereby the solenoid 27 of the electromagnetic switching valve 24 is energized. As a result of this, the plunger 28 is attracted by the magnetic force of the solenoid 27 and, thus, the opening valve 30 moves downwards against the spring force of the compression spring 31. Consequently, the pressure in the pressure control chamber 11 reaches the same level as the vacuum level in the vacuum chamber 10 thereby causing the opening valve 15 to close the valve port 13, whereby the feeding operation of the secondary air is stopped.

Contrary to this, when the throttle valve 6 is in the idling position and the number of revolutions of the engine is larger than a predetermined level, that is, at the time of deceleration, the comparator 45 is turned to the OFF condition. Consequently, the solenoid 27 is deenergized and, thus, the opening valve 30 closes the valve port 32 as is shown in FIG. 3. Therefore, since the pressure in the vacuum chamber 11 has reached atmospheric pressure, secondary air is fed into the exhaust manifold 3.

In FIG. 3, it is preferable that an output signal of the temperature detecting switch 42 be used as an input signal of the AND circuit 46. However, it is not always necessary to provide the engine with the temperature detecting switch 42.

According to the present invention, at the time of idling, the feeding operation of secondary air is stopped or the feeding amount of secondary air is reduced, thus preventing overheating of the catalyzer and thereby preventing deterioration of the catalyzer.

While the invention has been described with reference to specific embodiments chosen for purposes of illustration, it should be apparent that numerous modifications could be made thereto by those skilled in the art without departing from the spirit and scope of the invention.

What is claimed is:

1. A secondary air feeding control device of an internal combustion engine which comprises an intake passage having a throttle valve therein and an exhaust passage having a catalytic converter therein, comprising:

a secondary air passage connecting the atmosphere to said exhaust passage at a position upstream of said catalytic converter, and a secondary air control means in said secondary air passage and comprising a housing, a diaphragm in said housing, a flow rate control valve connected to said diaphragm for opening and closing to control the flow rate of secondary air flowing in said secondary air passage in accordance with movement of said diaphragm, a first and a second chamber separated by said diaphragm and defined in said housing, and a resilient member disposed in said housing for urging said diaphragm towards said second chamber in a valve closing direction, said first chamber being directly fluidly connected to said intake passage for controlling the amount of secondary air fed into said exhaust passage in response to a change in vacuum level in said intake passage, said second chamber being fluidly connected to a port which opens into said intake passage at a position downstream of the throttle valve when the throttle is in a fully closed idling position, but opens into said intake passage at a position upstream of said throttle valve when said throttle valve is opened whereby, when the engine is running with the throttle valve open, vacuum in said intake passage is transmitted to the first chamber and substantially atmospheric pressure is transmitted from said port to said second chamber to open said valve against the urging of said resilient member for feeding secondary air to the exhaust passage and, when the engine is idling with the throttle valve in its fully closed idling position, vacuum in said intake passage is transmitted to said first chamber and through said port to said second chamber so that the valve is closed by the urging of the resilient member for stopping the feeding operation of secondary air at the time of idling.

2. A secondary air feeding control device as recited in claim 1, wherein said flow rate control valve has a bypass hole capable of passing secondary air therethrough when said flow rate control valve is closed.

3. A secondary air feeding control device as recited in claim 1, wherein a reed valve is disposed in said secondary air passage between said flow rate control valve and said exhaust passage for permitting secondary air to flow only towards said exhaust passage.

4. A secondary air feeding control device as recited in claim 1, wherein said secondary air passage is connected to an air pump driven by the engine.

* * * * *